United States Patent
Pan et al.

(10) Patent No.: US 8,805,775 B1
(45) Date of Patent: Aug. 12, 2014

(54) MANAGEMENT OF REQUESTED OR PUSHED CONTENT IN COMMUNICATIONS CLIENT DEVICES

(75) Inventors: James Pan, Cupertino, CA (US);
Claudio Lima, San Jose, CA (US);
James Black, San Francisco, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 1268 days.

(21) Appl. No.: 11/249,554

(22) Filed: Oct. 13, 2005

(51) Int. Cl.
*G06F 17/00* (2006.01)
*G06F 7/00* (2006.01)

(52) U.S. Cl.
USPC ............ 707/609; 707/634; 707/636; 709/248

(58) Field of Classification Search
USPC ............... 725/80, 15, 46, 110; 709/206, 224; 707/10, 8
See application file for complete search history.

(56) References Cited

U.S. PATENT DOCUMENTS

| | | | | |
|---|---|---|---|---|
| 3,609,247 | A * | 9/1971 | Halstead | 455/41.1 |
| 5,521,631 | A * | 5/1996 | Budow et al. | 725/78 |
| 6,467,092 | B1 * | 10/2002 | Geile et al. | 725/131 |
| 6,636,888 | B1 * | 10/2003 | Bookspan et al. | 709/203 |
| 6,658,455 | B1 | 12/2003 | Weinman, Jr. | |
| 6,847,635 | B1 * | 1/2005 | Beser | 370/352 |
| 6,999,432 | B2 | 2/2006 | Zhang et al. | |
| 7,242,406 | B2 | 7/2007 | Robotham et al. | |
| 2001/0054180 | A1 * | 12/2001 | Atkinson | 725/32 |
| 2002/0016748 | A1 * | 2/2002 | Emodi et al. | 705/26 |
| 2002/0172366 | A1 * | 11/2002 | Peterka et al. | 380/277 |
| 2003/0014188 | A1 | 1/2003 | Abraham et al. | |
| 2003/0023745 | A1 * | 1/2003 | Noe | 709/235 |
| 2003/0037124 | A1 * | 2/2003 | Yamaura et al. | 709/219 |
| 2003/0112370 | A1 * | 6/2003 | Long et al. | 348/474 |
| 2004/0055448 | A1 * | 3/2004 | Byon | 84/626 |
| 2004/0158860 | A1 * | 8/2004 | Crow | 725/46 |
| 2005/0060598 | A1 * | 3/2005 | Klotz et al. | 714/4 |
| 2005/0089044 | A1 * | 4/2005 | Ciscon et al. | 370/395.21 |
| 2005/0125533 | A1 | 6/2005 | Svanbro et al. | |
| 2005/0141545 | A1 * | 6/2005 | Fein et al. | 370/445 |
| 2005/0229226 | A1 * | 10/2005 | Relan et al. | 725/114 |
| 2007/0252722 | A1 * | 11/2007 | Zigdon et al. | 340/870.03 |

OTHER PUBLICATIONS

Asis Nasipuri and Samir R. Das, Multichannel CSMA With Signal Power-Based Channel Selection for Multihop Wireless Networks, 2000, IEEE, pp. 211-218.*

* cited by examiner

*Primary Examiner* — Angelica Ruiz

(57) ABSTRACT

A system, a method and computer-readable media for managing content received over a network by a client device. A network transmission communicating an item of content is detected by a client device, and a determination is made whether the client device is in a mode of operation that allows the storing of uninvited media content. For example, the client device may be a mobile communication device monitoring the media being transmitted over a broadcast channel. When an item of content is observed traversing the broadcast channel, a set of user-defined preferences is accessed to determine whether to permit receiving the item. If permitted, the item of content is stored in a data store on the client device for subsequent presentation to the user.

11 Claims, 8 Drawing Sheets

MANAGEMENT OF REQUESTED OR PUSHED CONTENT IN COMMUNICATIONS CLIENT DEVICES

CROSS-REFERENCE TO RELATED APPLICATIONS

This application is related by subject matter to the invention disclosed in the following commonly assigned application: U.S. patent application Ser. No. 11/249,195, filed on even date herewith, entitled "PREDICTION-BASED ADAPTIVE CONTENT BROADCASTING OVER A NETWORK."

STATEMENT REGARDING FEDERALLY SPONSORED RESEARCH OR DEVELOPMENT

Not applicable.

BACKGROUND

Recent developments in wireless telecommunications have ushered in a new era of mobility. The advent of cellular and personal communications services has enabled people to maintain communication from virtually any location. Further, advanced technology has facilitated not only wireless voice communication but also wireless data communication, such as the ability to communicate over computer networks and to send and receive video and other content.

Wireless communications systems have existed for many years. In general, a wireless communications system uses mobile or fixed radios that communicate with a fixed radio tower that is in turn interconnected to a larger telecommunications network. Such systems can take a variety of forms. For example, traditional cellular communications systems provide radio coverage to a wide area, such as a city, through use of many radio towers. As another example, wireless office systems typically use 5 to 20 small radio base stations to offer radio coverage in small areas such as a school campus or hospital building.

Typically, subscribers to wireless service are equipped with one or more wireless terminals or "client devices, which may take any of a variety of forms. By way of example, a wireless client device may be a telephone, a pager, a computer, a personal digital assistant ("PDA") or any combination of these or other devices. A wireless client device may be configured to receive and/or convey information such as voice and data (e.g., fax, e-mail and other text messages) and/or other media (e.g., audio, video and graphics). Further, the client device may include input and output facilities such as a touch-pad, a keyboard, a camera, a display, a microphone and/or a speaker. Some client devices are equipped with web browsing software to allow subscribers to communicate with web servers over the Internet. Similarly, a client device may include logic to receive incoming data packets from a network, to assemble the packets in sequence, and to depacketize and decode the packet data so as to retrieve the underlying media signal.

In traditional wireless telecommunications systems, geographic areas are split into smaller areas called cells. The size and shape of each cell is defined by the range of a base station or radio port established by a wireless service provider at the core of the cell. Client devices are adapted to communicate over an air interface with these base stations, switching to the frequencies or codes of various cells as they travel from one cell to another. In addition, cells may be split into even smaller areas called sectors, by use of directional antennas or other technology.

Wireless networks and mobile wireless devices may use a number of channels to transmit and receive information, and a properly equipped wireless device can initiate communications by sending an initiation request message over one of these channels. Applying industry standards, the initiation request message may include a code that characterizes the requested communication as packet-data communication, as compared with traditional voice communication.

Despite the many recent advances in wireless networking and communication devices, a variety of deficiencies still exist in the art. As one problem, client devices today provide inadequate techniques for managing receipt of content over a network. For instance, a variety of content may be transmitted to and stored on a client device. Receiving these transmissions often depletes limited battery resources and consumes available memory. As client devices may not provide users the ability to prevent receipt of unwanted media, the consumption of these battery and memory resources may cause user frustration and may hinder desired operations. Further, once the content is stored on the device, inadequate user interfaces may make it difficult for the user to efficiently interact with and manage the content. With the proliferation of available content, the problems associated with inadequate content management techniques will be exacerbated over time. Accordingly, there is a need for improved techniques for allowing mobile devices to efficiently manage the receipt of content over a network.

SUMMARY

The present invention meets the above needs and overcomes one or more deficiencies in the prior art by providing systems and methods for managing content received over a network by a client device. In one aspect of an embodiment of the present invention, a computer-implemented method is provided. A network transmission communicating an item of content is detected, and a determination is made whether the client device is configured to receive the transmission. A set of user-defined preferences is accessed to determine whether to permit receiving the item. If permitted, the item of content is stored in a data store on the client device.

Another aspect of an embodiment of the present invention includes a system for controlling receipt of content available over a network. The system includes a data store for storing items of content received over the network. A transmission-detection component detects network transmissions communicating content over the network. A content-selection component is configured to utilize user-defined preferences to determine whether to receive the communicated content. The system also includes an interface component for receiving user inputs requesting presentation of content stored in the data store.

A further aspect of an embodiment of the present invention includes a computerized method for managing content received over a network by a client device. A predetermined portion of an item of content is receiving over a network communication channel. After the predetermined portion is received, the method may cease the receipt of the content, and the portion is presented to the user. Upon receiving an input requesting that the item of content be received, the method requests receiving the content and stores the content on the client device. Alternatively, the method may receive the entire item of content, but displays a predetermined portion of the content. Upon receiving an input requesting that the item of content be viewed, the method follows a predetermined computer-implemented procedure to display the entire item of content.

BRIEF DESCRIPTION OF THE SEVERAL VIEWS OF THE DRAWING

The present invention is described in detail below with reference to the attached drawing figures, wherein.

DETAILED DESCRIPTION

Figure 1:
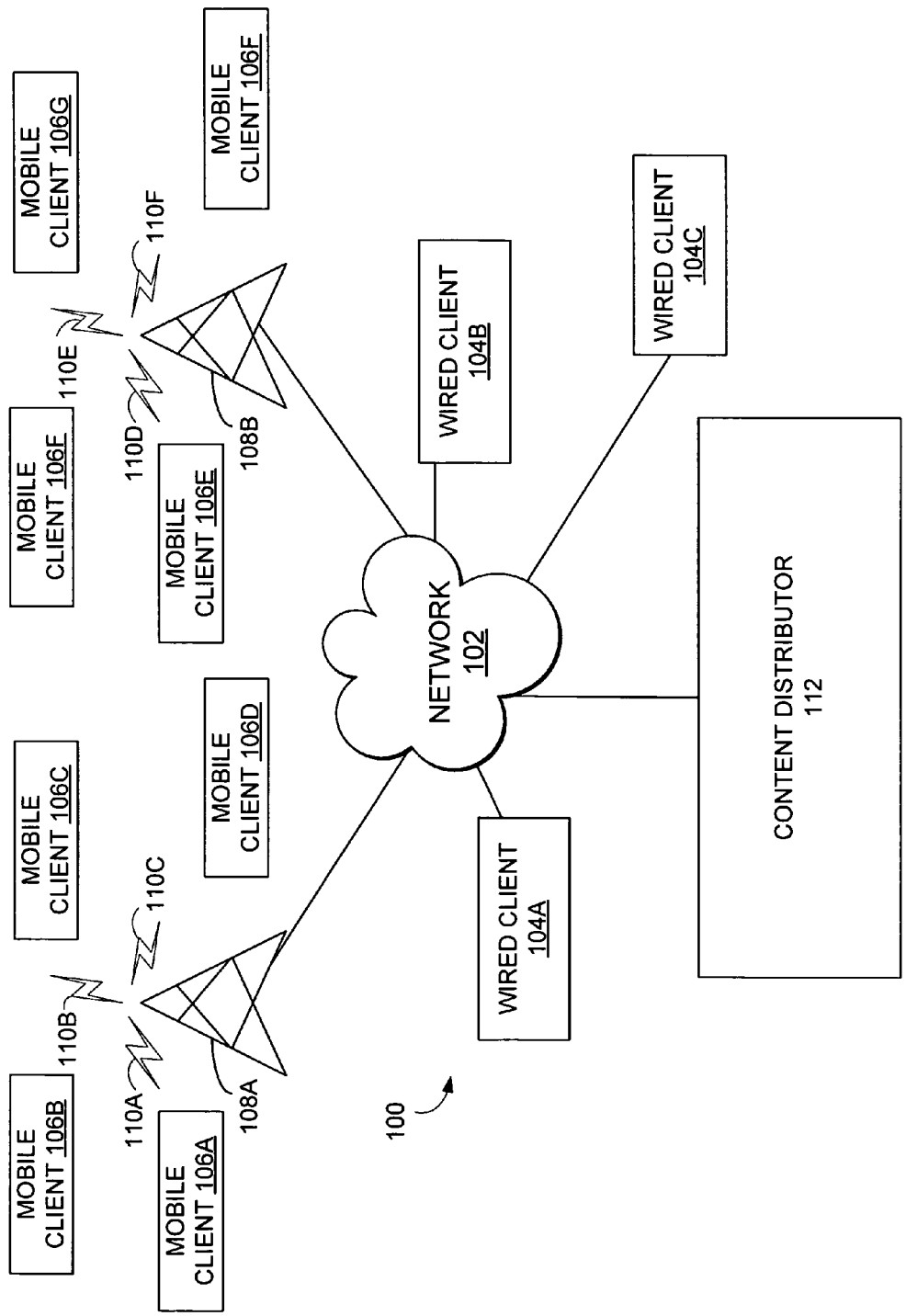
FIG. 1 is a block diagram of a network environment suitable for use in implementing the present invention.

The subject matter of the present invention is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

The present invention provides an improved system and method for managing content received over a network. The invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data. The invention may be practiced Computer-readable media include both volatile and nonvolatile media, removable and nonremovable media, and contemplates media readable by a database, a switch, and various other network devices. Network switches, routers, and related components are conventional in nature, as are means of communicating with the same.

The present invention may be embodied as, among other things: a method, system, computer-program product, or combinations thereof. Accordingly, the present invention may take the form of a hardware embodiment, a software embodiment, or an embodiment combining software and hardware. In one embodiment, the present invention takes the form of a computer-program product that includes computer-useable instructions embodied on one or more computer-readable media.

The present invention may be practiced in any network environment such as a communications network. Such networks are widely used to connect various types of network elements, such as routers, servers, gateways, network telephones, and so forth. Further, the invention may be practiced in a multi-network environment having various, connected public and/or private networks. The networks may be wireless or wireline ("wired"). As will be appreciated by those skilled in the art, communication networks may take several of different forms and may use several different communication protocols.

FIG. 1 illustrates a network environment 100 that represents an exemplary environment in which the present invention may be practiced. It is important to note that network environments in which the present invention may operate may be arranged in a variety of configurations, and the network environment 100 of FIG. 1 provides only one exemplary network environment.

The network environment 100 includes a network 102. The network 102 may be any network or combination of networks configured to provide communications between network devices. The network 102 provides communication services for wired clients 104A-104C. The wired clients 104A-104C may be any computing devices connected to the network 102, and each of the wired clients 104A-104C may have an address, such as an Internet protocol (IP) address, for uniquely identifying that client. The wired clients 104A-104C may interact with the network 102 to receive a variety of content such as voice, data or video.

The network 102 may also include a wireless communication system configured to provide communication services to mobile clients 106A-106F. In an exemplary wireless communication system, each mobile client 106A-106F may communicate via an air interface with a base transceiver station 108A or a base transceiver station 108B. The base transceiver stations 108A and 108B may be coupled to any number of different devices that enable connectivity with the network 102, the public Internet and/or a private intranet (e.g., a wireless carrier's core network). The mobile clients 106A-106F may thus communicate with any number of entities on the network 102. For example, the mobile clients 106A-106F may receive content from a content distributor 112. The content distributor 112 may be any device capable of distributing content to the mobile clients 106A-106F and/or wired clients 104A-104C. This distribution may occur in response to a user's request or may occur automatically, without user interaction.

The base transceiver stations 108A and 108B may utilize any number of wireless technologies or standards known in the art to communicate with the mobile clients 106A-106F. In one embodiment, the base transceiver stations 108A and 108B may maintain a plurality of communication channels. For example, the base transceiver station 108A may offer channels 110A-110C, while the base transceiver station 108B offers channels 110D-110F. The channels 110A-110F may be wireless Code Division Multiple Access (CDMA), Global System for Mobile (GSM) or others spectrum channels/slots. Accordingly, each user may have access to all available channels (i.e., the entire spectrum will be available to all handsets). The CDMA code sequence or other means may be used to define a "channel" and to enable a particular handset to access the channel at a particular time. A portion of the channels 110A-110F may be used for real-time voice/data communications. For example, the mobile client 106A may utilize the channel 110B to send and receive voice data (i.e., for a telephone call). As another example, the mobile client 106A may submit a request to view a video provided by the content distributor 112. One of the channels 110A-110C may be dedicated for communication of this video from the content distributor 112 to the mobile client 106A. The channels 110A-110F may also be used to broadcast or multi-cast content to the more than one of the mobile clients 106A-106F. For example, an emergency notice may be transmitted via the channel 110E to each device in range of the base transceiver station 108B. Also, content may be transmitted over one of the channels 110A-110F to only a portion of the mobile client within range of a base transceiver station. For example, content from the content distributor 112 may be transmitted over the channel 110D in a group delivery to the mobile clients 106E and 106F. Such broadcasting and multi-casting techniques are well known in the art.

Figure 2:
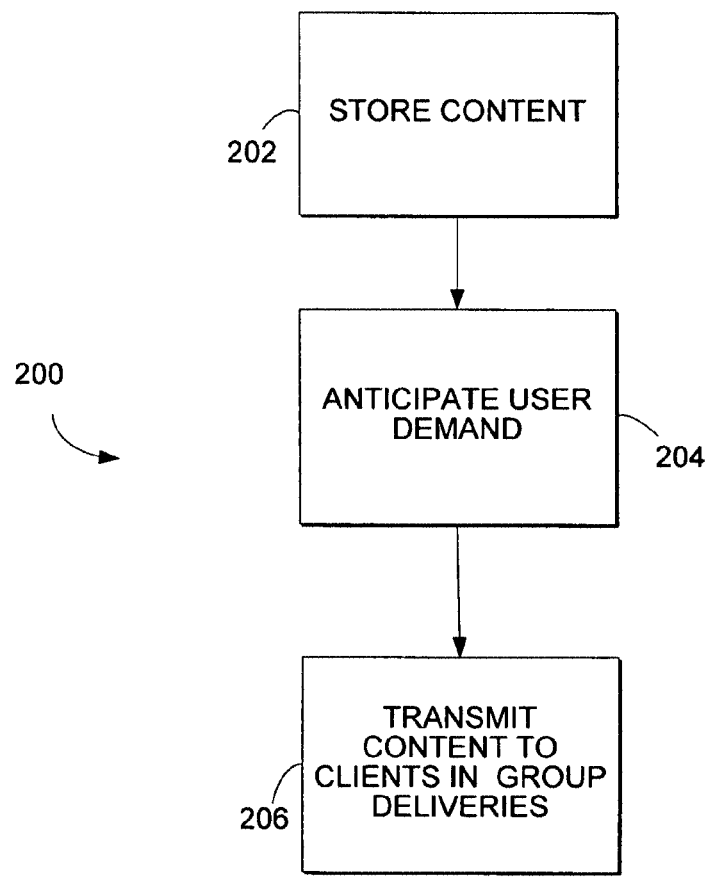
FIG. 2 illustrates a method in accordance with the present invention for providing content to client devices over a network.

FIG. 2 illustrates a method 200 for providing content to client devices over a network. At a step 202, the method 200 stores items of content for transmission over the network. A variety of content may be stored by the method 200, and the content may be stored in a number of formats. For example, video content and/or audio content may be stored. The content may be obtained from different sources. In one embodiment, client devices may be configured to access information about the content and to request transmission of content over the network. For example, a client device may have an interface in which a user may indicate desire to view an item of content. Responsive to this input, the desired content may be transmitted "on-demand" to the client device. Depending on the composition of the network, the transmission may be accomplished wirelessly or over a wired connection. The content may also be streamed to the client device such that the user may view the content as it is being received. As will be appreciated by those skilled in the art, various techniques exist in the art for delivering requested items of content over a network to client devices.

At a step 204, the method 200 anticipates user requests to view items of content. As will be discussed subsequently, by anticipating demand, the method 200 may efficiently deliver content to client devices in advance of a user's request to view content. Anticipation of user requests may use any number of algorithms and may consider a variety of factors. For example, the method 200 may anticipate that users will demand certain subscription-based items. This content may include, for example, news reports that are periodically updated (e.g., top news stories). Demand anticipation may also be based on the popularity of an item of content. The number of consumer hits may be used to measure the popularity. Further, the method 200 may use correlative studies to anticipate demand of related content. The anticipation of requests may also consider time and location. For example, the method 200 may anticipate user requests for traffic conditions everyday at rush hour. Of course, these traffic conditions will be location dependent as well. As another example of location specific content, the football scores of a city's team may be popular only in that city and not throughout the country. Accordingly, the demand anticipation may incorporate geographic limits. In one embodiment, the method 200, through its predictive and dynamic anticipation of user demand, automatically recognizes popular content. For example, a large number of users may be located in a baseball stadium during a game. If the power in the stadium were to go out, a number of these users may submit requests to view the local news so as to ascertain the cause of the power failure. After receiving a portion of these requests, the method 200 may recognize increased demand in that location for the local news and, thus, may anticipate further requests. In one embodiment, historical demand records are used to anticipate future demand. As will be appreciated by those skilled in the art, any number of predictive algorithms may be used to anticipate user requests, and any number of these algorithms may be used in connection with the present invention.

The method 200, at a step 206, transmits items of content to client devices in a group delivery. In one embodiment, the method 200 selects content for transmission by considering the requests that were anticipated at the step 204. For example, a popular piece of video content may contain news of interest nationally, and the method 200 may anticipate that a large number of users will desire to view this content. Accordingly, the method 200 may transmit this video to multiple clients in a single group delivery. The client devices may store the received content in a cache and may play the content on-demand to a user. In one embodiment, a wireless network may include a broadcast channel configured to broadcast selected content network-wide. Client devices may receive and store content transmitted over this broadcast channel. When a user desires to view the content, it will be already stored on their device and no additional network communications may be required. In this way, a single broadcast of the content may serve multiple clients. Those skilled in the art will appreciate that by predicatively pushing content onto client devices, network bandwidth may be preserved. By transmitting the same content to multiple clients in the same transmission, the need to separately initiate point-to-point transmissions over the network may be reduced.

Beside network-wide broadcasts, the group deliveries of the step 206 may also transmit selected content to limited groups. For example, content may be multicast to client devices residing in a particular cell. A client device in the cell may make a request for a specific piece of content. In complying with this request, the method 200 may multicast the content to other client devices in the cell. In operation, the method 200 may use Forward Link Push and Reverse Link Signal to indicate the receiving status of an intended client device. Each client device in the cell may receive the content, or a sub-set of clients may be selected for content receipt. In another embodiment, the group delivery may be directed to client devices having IP addresses on a wired network. For example, the method 200 may use historical user demand data to determine a list of clients that regularly request an item of content. When this item is updated, the new content may be pushed to the clients in a group delivery. In sum, the method 200 controls which client devices will receive the broadcast/multicast content and controls the timing of these transmissions. Those skilled in the art will recognize that such broadcasting and multicasting techniques are well known in the art for both wired and wireless networks.

Figure 3:
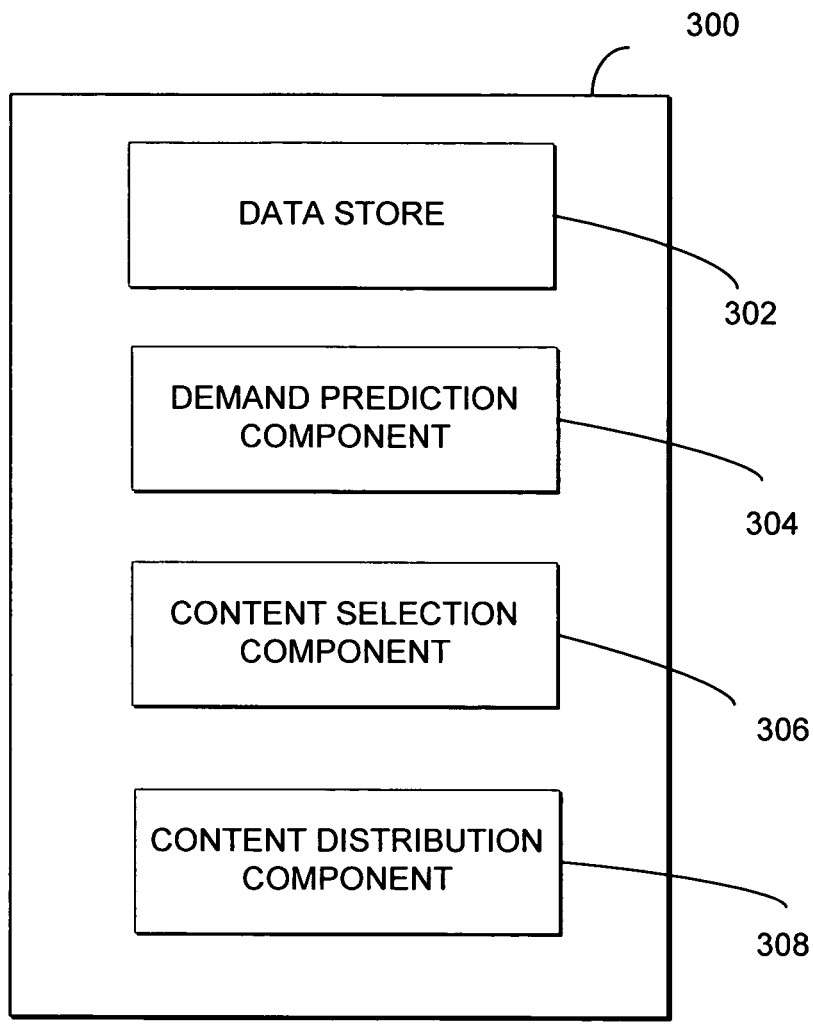
FIG. 3 is a schematic diagram representing a system in accordance with the present invention for distributing content to client devices over a network.

FIG. 3 illustrates a system 300 for distributing content to client devices over a network. The system 300 includes a data store 302 containing one or more items of content. A variety of content may be stored in the data store 302, and the stored content may originate from a variety of sources. Further, the data store 302 may include a variety of distributed storage media residing in different locations and under the control of different entities. At least a portion of the content stored in the data store 302 may be configured for transmission over a network. For example, the data store 302 may include videos that may be communicated over the network and presented on client devices. In one embodiment, users may access the data store 302 and may request to view items of content. Such content may also be transmitted to the client devices before such requests are received. In this instance, a user desiring to view the content may simply access the cached content on their device without initiating additional network communications.

The system 300 also includes a demand prediction component 304. The demand prediction component 304 is configured to anticipate user demands to view the content stored in the data store 304. For example, the demand prediction component 304 may track received requests and use this tracking information to anticipate future requests. In one embodiment, the demand prediction component 304 tracks which content is being requested, when it is requested and where the client devices reside. Accordingly, the demand prediction component 304 can predict the time and geographic area where a specific piece of content will be requested/popular. For example, the demand prediction component 304 may recognize that a comedy program may be popular nationally and that users request this program at any time. In contrast, the demand prediction component 304 may observe that a ski report is generally demanded in the morning and in areas surrounding ski resorts. As will be appreciated by those skilled in the art, a variety of different demand profiles may be used by the demand prediction component 304 to anticipate demand.

The system 300 also includes a content selection component 306 configured to select content for group delivery to multiple client devices. In one embodiment, the content selection component 306 utilizes the demand predications of the demand prediction component 304 to select content. For example, returning to the ski report example, the content selection component 306 may select to broadcast the ski report to client devices in sectors surrounding ski resorts every morning. As for the comedy program, this content may be selected for broadcasting to devices across the country in a network-wide broadcast. As this content was requested at different times, the broadcast may occur when there is excess network capacity (e.g., in the middle of the night). The content selection component 306 may use information other than the demand predictions to select content. In one embodiment, a variety of subscription-based content may be made available over the network. For example, a news outlet may provide a piece of content that is periodically updated throughout the day. Instead of requiring subscribers to request delivery of the updated content, the content selection component 306 may select this content for a group delivery whenever the news is updated. In this way, each subscriber will receive the updated news as soon as it is available and without the need to consume additional network resources.

A content distribution component 308 is also included in the system 300. The content distribution component 308 may be configured to distribute the items of content selected by the content selection component 306. The selected items may be distributed in group deliveries; as previously mentioned, multiple client devices may receive the same network transmission. Upon receipt of the content, the client devices can store the content for potential later use by a user. The content distribution component 308 may distribute the content network-wide or only to a limited number of devices (e.g., devices in a specific cell or sector). Further, the content distribution component 308 may delay distribution until there are adequate network resources available. The content distribution component 308 may use broadcast channels to distribute the content or may use channels that are also used for point-to-point communications. The distributed content may include a variety of content management protocols that indicate properties such unique content index, size compression protocol/level, modification time and content price. Further, a variety of business methods may be implements with regard to the pushed content. For example, the transmitted content may be encrypted and, thus, require a purchased encryption key. Similarly, though content may be stored on the client device, digital right management functionality may require that the user pay to view the content. In one embodiment, the user may be presented a preview of the content, but then be required to pay to view the balance of the media. As the content distribution component 308 is capable of efficiently pushing intelligently selected content onto many devices, the system 300 may provide the opportunity for greater number of users to view and/or purchase the available content.

Figure 4:
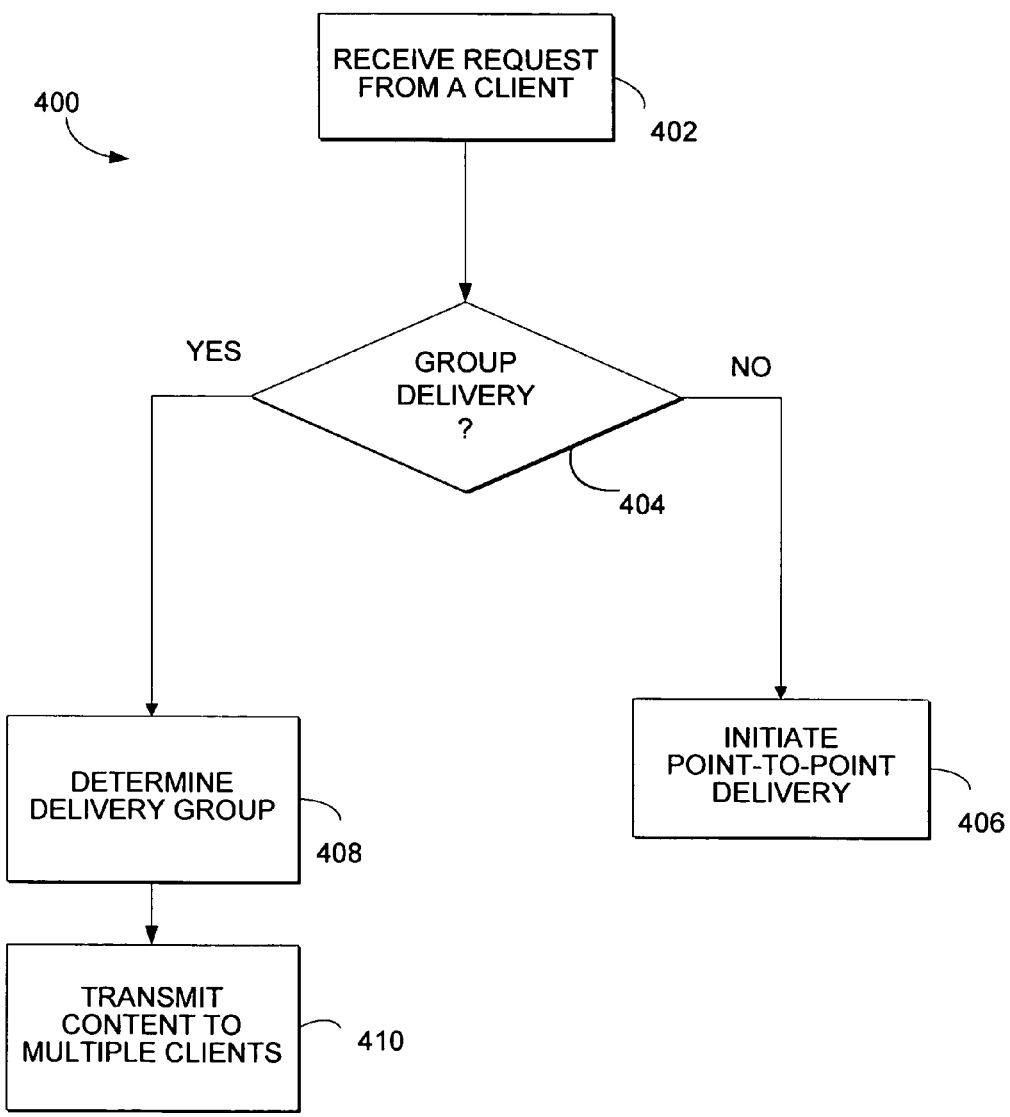
FIG. 4 illustrates a method in accordance with, the present invention for distributing content to multiple client devices in response to a user request.

FIG. 4 illustrates a method 400 for distributing content to multiple client devices in response to a user request. At a step 402, the method 400 receives a request from a client device to receive a piece of content over the network. For example, the requested content may be a video or an audio file. In response to this request, the method 400, at a step 404, determines whether the requested content should be distributed in a group delivery to multiple clients. To make this determination a variety of factors may be considered by the method 400. For example, the popularity of the requested content may be considered. In addition, the location of the requesting user may be of interest. As an example, a user at a baseball game may request game statistics. As the statistics may be of interest to everyone at the game, the method 400 may determine at the step 404 that a group delivery to each device residing in or around the baseball stadium is appropriate. In the alternative, the user may request an esoteric piece of content rarely accessed. In this case, group delivery may not be appropriate, and, at a step 406, the method 400 will deliver the requested content to the client device via a point-to-point delivery.

When the step 404 indicated that a group delivery is appropriate, the method 400, at a step 408, determines the composition of the group. For example, the group may consist of each device residing within the requester's cell/sector. However, larger areas may be selected, such as a metropolitan area or even a network-wide broadcast. In one embodiment, other devices may be selected specifically to receive the broadcast.

For example, the requested content may be a piece of subscription content, and the selected delivery group may be each device in a cell that also subscribe to the content. Once the delivery group is selected, at a step 410, the method 400 transmits the selected content to the requesting device and to the delivery group in a single transmission. As will be appreciated by those skilled in the art, by responding to user requests with group broadcasts/multicasts, the method 400 may preserve network resources by reducing the need for subsequent transmission of the same content to multiple devices.

Figure 5:
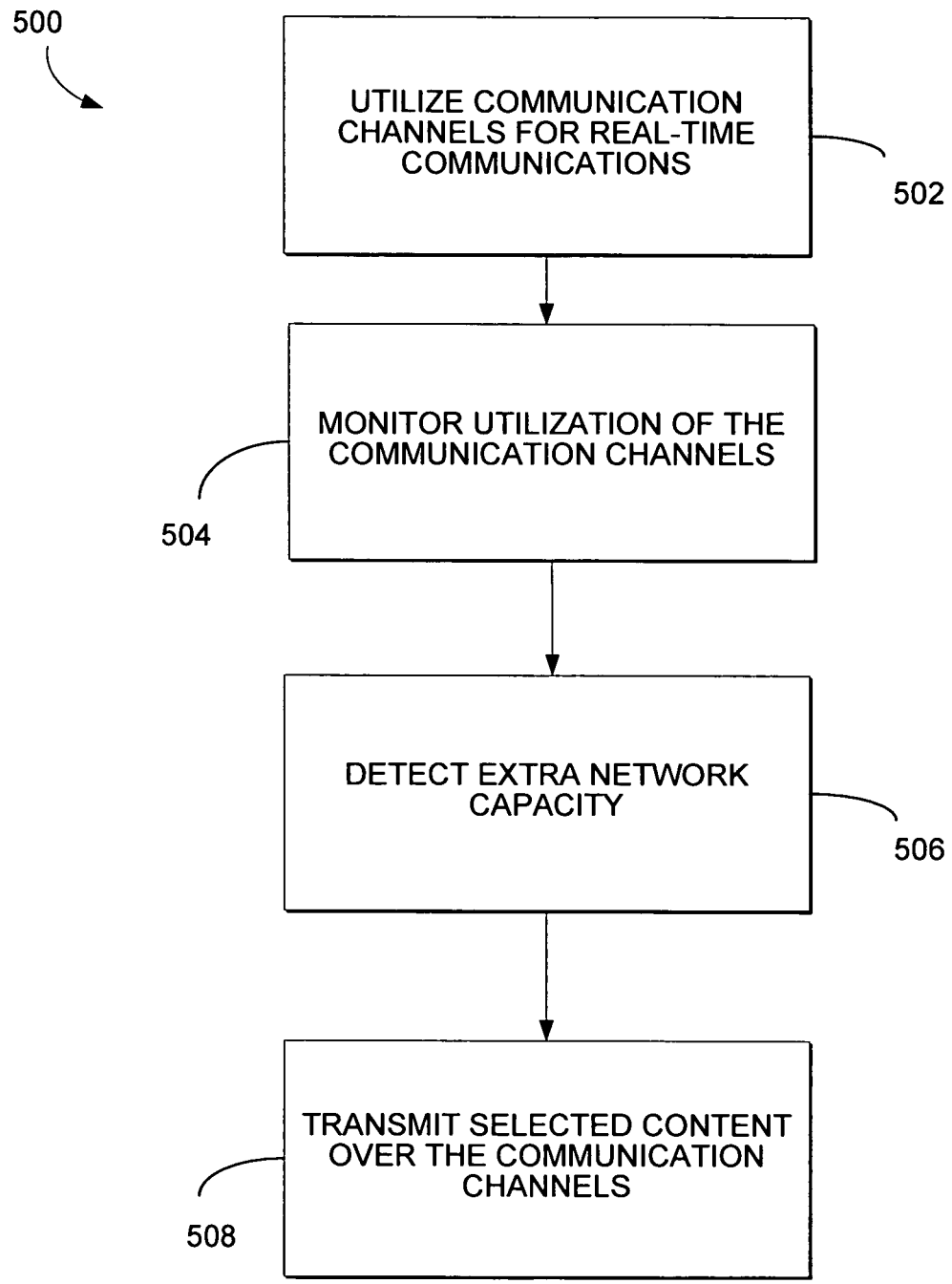
FIG. 5 illustrates a method in accordance with the present invention for allocating broadcast resources.

FIG. 5 illustrates a method 500 for allocating broadcast resources. At a step 502, the method 500 utilizes communication channels to transmit real-time communications to client devices. For example the real-time communications may include voice transmissions (i.e., telephone conversations) or requested data. In one embodiment, a communications network may include various channels for use in providing services. At any given time, a portion of these channels may be dedicated to point-to-point communications such as real-time communications, while other channels are used to broadcast information to client devices in point-to-multipoint communications.

At a step 504, the method 500 monitors utilization of the communication channels. For example, throughout the day the number of concurrent real-time communications may fluctuate. For example, in the middle of the night there may be few real-time communications, while a large number of communications may occur in the early evening. Relying on the utilization monitoring, at a step 506, the method 500 detects extra network capacity. As the number of real-time communications decreases, the utilization of the communication channels will also decrease, and, thus, the communication channels will experience excess capacity. Such extra capacity may be indicated network-wide or in a specific cell/sector. The extra capacity may also be predicted based on time-recurring short-term periods. Those skilled in the art will recognize that a variety of techniques exist in the art to monitor network utilization and network capacity and that the present invention may incorporate any number of these know techniques.

The method 500, at a step 508, broadcasts selected content to multiple client devices over at least one of the communication channels. This broadcasting may occur when the utilization monitoring indicates low network utilization. In this way, the method 500 may adoptively allocate broadcast resources. For example, users may often requested a video, regardless of the time of day. As this item may be stored in anticipation of a user's viewing request, the network 500 may broadcast it to multiple clients when there is available capacity on the network. As previously discussed, any number of selection algorithms may be implemented to decide what content should be broadcast to client devices. Further, additional quality of service operations may be implemented when there is additional network utilization. For example, content may be broadcast with Forward Error Correction (FEC) coding when the network has extra capacity. Also, the client devices may indicate transmission errors and receive corrections. As the content is passively stored, any number of quality assurance operation may be performed without the user experiencing poor quality. In one embodiment, the method 500 dynamically switches the modes of the communication channels between dedicated channels for real-time voice/data and broadcast channels based on network capacity. In this manner, the method 500 may adaptively allocate broadcast channels in the presence of extra network capacity and without comprising real-time communications.

Figure 6:
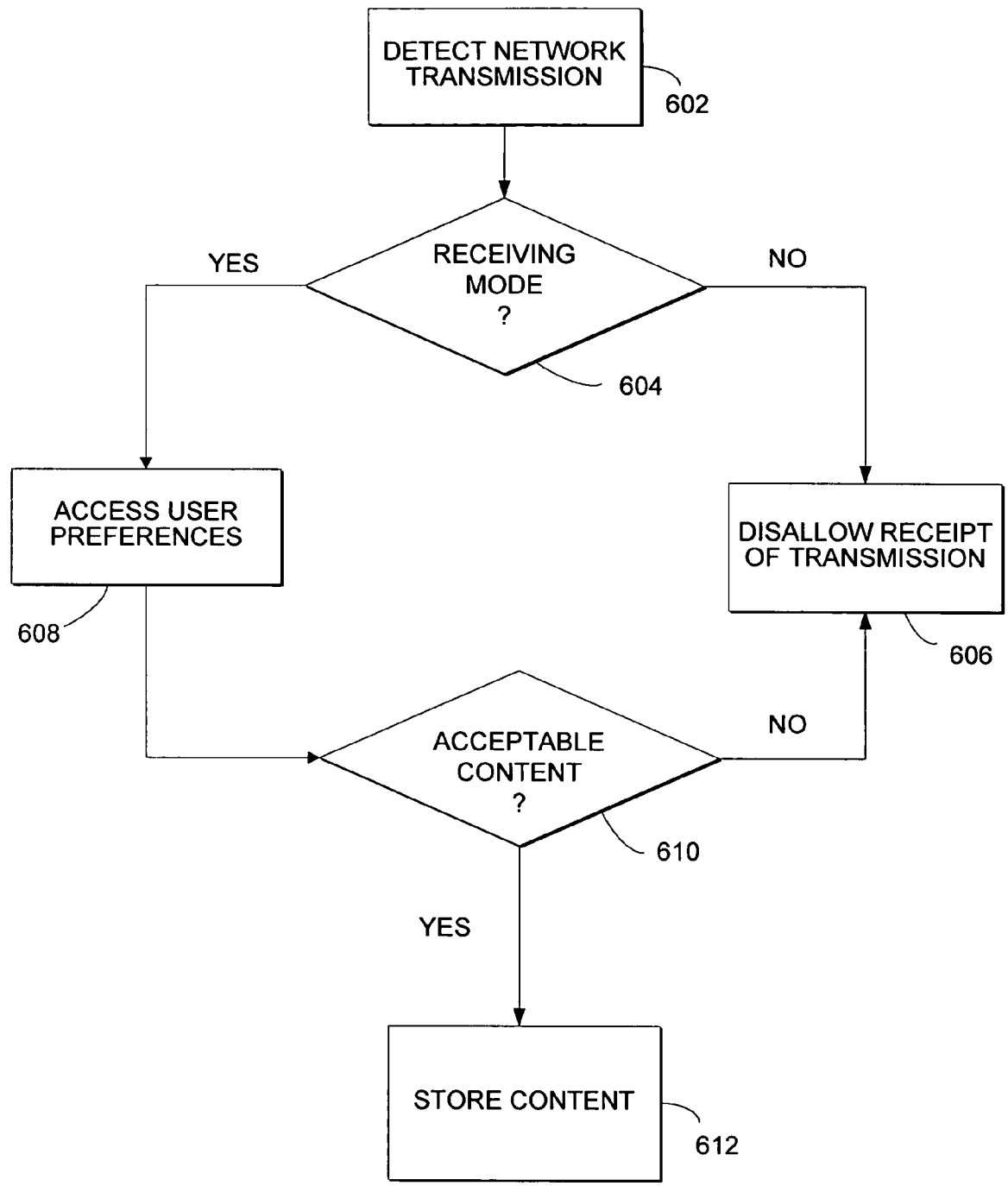
FIG. 6 illustrates a method in accordance with the present invention for managing content received over a network by a client device.

FIG. 6 illustrates a method 600 for managing content received over a network by a client device. At a step 602, the method 600 detects a network transmission communicating an item of content over the network. Any network transmission may be detected at the step 602. For example, the content may be a video to be presented by the client device. In one embodiment, the content may be transmitted over a wireless network. For example, the detected transmission may by the transmission of the step 206 of FIG. 2.

The method 600, at a step 604, determines whether the client device is in a mode of operation configured to receive the transmission. The device may be in a mode that limits receipt of content over the network. For example, the device may disallow receipt of any content or may consider various properties of the transmitted content in limiting its receipt. Also, content may not be received because of a lack of enough available memory on the client device. In one embodiment, the client device may include a battery-saving mode that disallows receipt of content when the device is operating on power from a battery. If the client device is in a mode that limits the receipt of content, at a step 606, the method 600 disallows receipt of the transmission.

If the client device is configured to receive the transmission, the method 600, at a step 608, accesses a set of user-defined preferences to determine whether to permit receiving the item of content over the network. Any number of preferences may be defined, including preferences based on device characteristics and user preferences. For example, a user may request/invite that specific content or types of content be received. For example, a user may invite all sports-related content. The user may also indicate what content should be disallowed. For example, the user may disallow receipt of all content over a certain maximum size. Of course, the user may also indicate that all content may be stored on the device. A variety of other content properties may be considered when determining whether to receive and store the content. The transmission may relate to the updating of old content, and the user may indicate a desire for such updating. The transmission may also relate to the automatic repair of content; missing or erroneous content bytes/frames may be fixed by reception of duplicate copies of the content. Similarly, the transmission may complete a previous, partial transmission of the content.

The method 600, at a step 610, utilizes the user-defined preferences to determine whether to allow receipt of the content. If the user-defined preferences indicate that the content being transmitted is not acceptable, the method 600 disallows receipt of the transmission at the step 606. Alternatively, if the content is acceptable, the method 600 receives and stores the transmitted content at a step 612. The data store used to store the content may be associated with a variety of content management utilities. The data store may manage storage space by saving content until there is a space overflow, or the data store may automatically delete content after a period of time. Different storage rules may apply to invited and uninvited content. In sum, any number of memory management rules may be associated with the received content.

To allow user management of the received content, a variety of interfaces may be presented. For example, the user may be presented a listing of the stored content, and the user may indicate a desire to view an item of content. In one embodiment, the user may be required to agree to pay for viewing selected content. In this embodiment, the client device may send a payment confirmation over the network. The user interface may indicate when new content arrives and may also indicate whether the content is invited or uninvited. The user may define display preferences to control the arrangement of content. Further, the user interface may provide the user the ability to invite or disallow certain content. This interaction may aid in refining the user-defined preferences utilized at the step 610. The interface may also provide previews of the stored content to help the user decide whether to view/purchase content. As will be appreciated by those skilled in the art, any number of content storage management and content viewing options may be presented to the user in connection with the received content.

Figure 7:
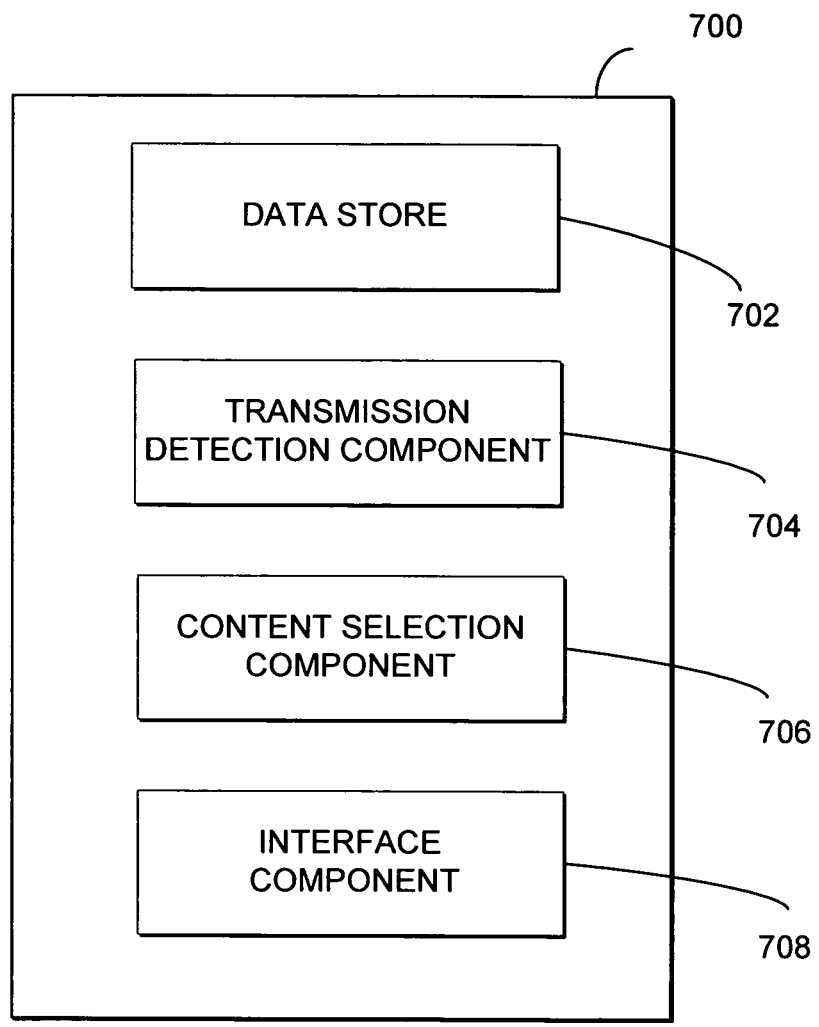
FIG. 7 is a schematic diagram illustrating a system for controlling receipt of content available over a network.

FIG. 7 illustrates a system 700 for controlling receipt of content available over a network. The system 700 includes a data store 702 for storing items of content received over the network. The system 700 may reside on a variety of devices in communication with any number of networks, and the data store 702 may store any type of content. In one embodiment, the system 700 resides on a handheld device configured to access a network, such as a wireless network. As the handheld device may present a variety of content to a user, the data store 702 may contain any content acceptable for such presentation. For example, the device may be configured to play video content, and the data store 702 may store video content received over the network.

The system 700 further includes a transmission detection component 704. The transmission detection component 704 may be configured to detect network transmissions communicating content over the network. Any network transmission may be detected by the transmission detection component 704. In one embodiment, a variety of content may be transmitted over the network in anticipation of a user's request to view the content. Alternatively, the content may be communicated in response to a user's explicit request. Further, the transmitted content may be an update or repair to currently stored content.

A content selection component 706 is also included in the system 700. The content selection component 706 may be configured to determine whether to receive the communicated content by utilizing user-defined preferences. As previously mentioned, any number of user-defined preferences may be indicated by the user or may be provided by the system 700. These preferences may act as a filter to block unwanted content and to intelligently utilize content storage space on a device. The user-defined preferences may be explicitly set forth by the user, may exist in default or may be assumed based on historic user behavior. The content selection component 706 may also consider memory and battery-related concerns when evaluating whether or not to receive and store transmitted content. If the content selection component 706 determines that the content being transmitted does not comport with the defined preferences, receipt of the transmission will be disallowed. In the alternative, if the preferences allow such receipt, the content selection component 706 will permit the content to be received and stored in the data store 702.

The system 700 also includes an interface component 708. The interface component 708 may be configured to receive user inputs related to presentation of the content stored in the data store 702. A variety of presentation techniques may be utilized by the interface component 708. For example, an interface may list the received content and additional information about the content. The listed content may be organized in different categories. For example, invited content may be listed separately from uninvited content. The interface component 708 may also include a variety of options related to viewing the content. These may include playback controls or the ability to preview content before submitting payment information (if required). The presentation of the content may be subject to any number of digital rights management restrictions, and the interface component 708 may facilitate the user in obtaining rights to view protected content.

Figure 8:
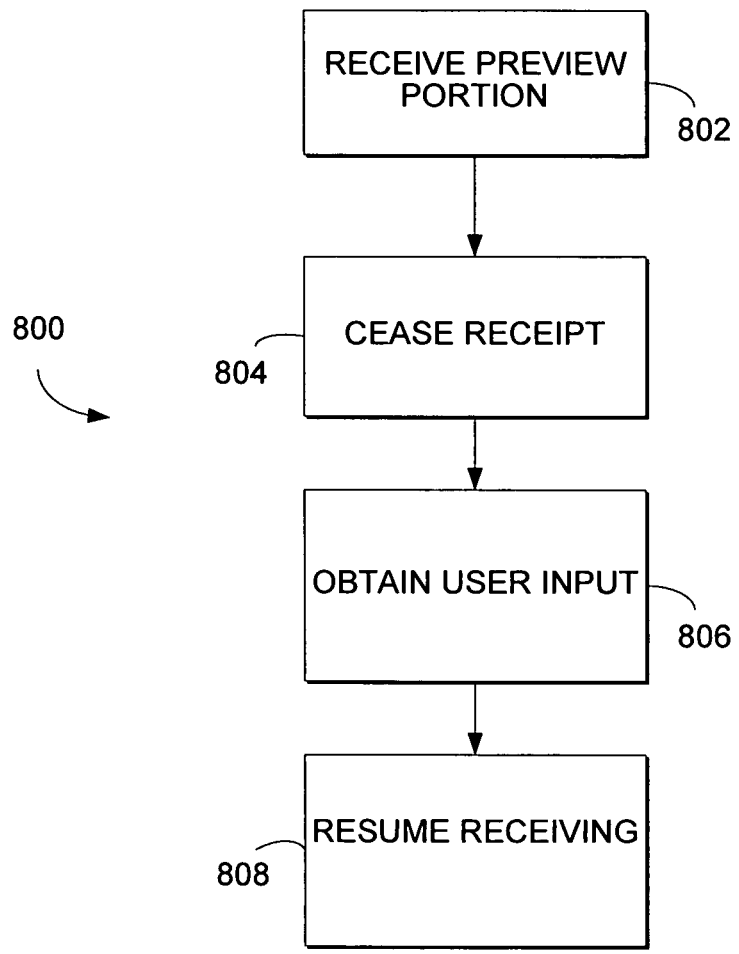
FIG. 8 illustrates a method in accordance with the present invention for managing content received over a network by a client device.

FIG. 8 illustrates a method 800 for managing content received over a network by a client device. At a step 802, the client device receives a portion of an item of content over the network. The transmitted content may be requested by the user or may be provided without such a request. In one embodiment, the received portion of the content may be a preview of the item of content. For example, the first minute of a video may serve as a preview of the video. As will be understood by those skilled in the art, the preview portion may be defined in a variety of different ways. The portion may be a set length of time, or it may be defined with the use of an enhanced protocol having content dependent bits setting forth the preview.

Once the portion is received and stored, at a step 804, the method 800 ceases receiving the content. In one embodiment, the method 800 will receive only the preview portion to conserve battery power. As receiving content may be taxing on a battery, by receiving a portion of the content, the user may take advantage of available content, while not having their battery power diminished by unwanted receiving.

At a step 806, the method 800 obtains a user input requesting that the entire item of content be received. In one embodiment, the user may be presented the preview portion of the content, and, based on this preview, the user may decide whether or not to allow the rest of the item to be received and stored. If the user indicates a desire to receive the item of content, the method 800, at a step 808 resume receiving of the item of content and may store the content on the device. Once this receipt is completed, the user may then access a data store on the client device and may view the entire piece of content.

Alternative embodiments and implementations of the present invention will become apparent to those skilled in the art to which it pertains upon review of the specification, including the drawing figures. Accordingly, the scope of the present invention is defined by the appended claims rather than the foregoing description.

The invention claimed is:

1. A system for controlling receipt of content available over a network, said system comprising:
    a data store for storing one or more items of content received over said network;
    a transmission-detection component to monitor a broadcast channel to detect a multi-cast communicating items of media content over said network, wherein said broadcast channel delivers said items of media content to a plurality of client devices residing in a specific cell or sector, wherein transmission of said multi-cast is initiated in response to a request by one of said plurality of client devices requesting an on-demand transmission of one of said items of media content to the one requesting client device and wherein the on-demand transmission request initiates said multi-cast which delivers requested content to the client device that transmitted said request and to one or more additional devices that did not invite transmission of said requested content;
    a content-selection component configured to utilize user-defined preferences to determine whether to receive and store at least one of said items of media content communicated by said multi-cast, wherein said user-defined preferences include preferences regarding storing of uninvited media content, wherein received items of content are added to said one or more items of content stored in said data store; and an interface component configured to receive a user input requesting presentation of at least one of said one or more items of content stored in said data store.

2. The system of claim 1, wherein said data store resides on a handheld device configured to receive video content over a wireless network.

3. The system of claim 1, wherein at least a portion of said multi-cast broadcast said at least one items of media content to one or more client devices in one or more group deliveries.

4. The system of claim 3, wherein at least a portion of said one or more group deliveries are targeted towards client devices residing in a defined geographic area.

5. The system of claim 1, wherein said user-defined preferences include one or more filters configured to block receipt of unwanted content.

6. The system of claim 1, wherein said content-selection component is further configured to access one or more device settings related to memory or battery usage in determining whether to receive at least one item of content.

7. The system of claim 1, wherein said interface component is configured to present a listing of at least a portion of said one or more items of content stored in said data store.

8. One or more tangible computer-readable media having computer-useable instructions embodied thereon to perform a method for managing content received over a network by a client device, said method comprising:

monitoring a broadcast channel to detect a multi-cast communicating items of media content over said network, wherein said multi-cast delivers said items of media content to a plurality of client devices residing in a specific cell or sector, wherein transmission of said multi-cast is initiated in response to a request by one of said plurality of client devices requesting an on-demand transmission of one of said items of media content to the one requesting client device and wherein the on-demand transmission request initiates said multi-cast which delivers requested content to the client device that transmitted said request and to one or more additional devices that did not invite transmission of said requested content;

determining, before storing a portion of said items of media content, whether said client device is in a mode of operation that allows storing of uninvited media content;

incident to a determination that said client device is in a mode of operation that allows storing of uninvited media content, receiving at least a predetermined portion of an item of content, wherein said item of content is configured for a presentation to a user;

ceasing said receiving after receipt of said predetermined preview portion of said item of content;

presenting said predetermined preview portion of said item of content to said user;

receiving an input from said user in response to said presenting, wherein said input includes a request that the entirety of said item of content be transmitted to said client device;

resuming said receiving of said item of content in response to said input; and storing said item of content in a data store on said client device.

9. The computer-readable media of claim 8, wherein said predetermined preview portion of said item of content is defined through use of an enhanced protocol.

10. The computer-readable media of claim 8, wherein said method further comprises receiving payment information from said user, wherein said payment information is associated with receipt of said item of content.

11. The computer-readable media of claim 8, wherein said multi-cast is a provided by a wireless network.

* * * * *